United States Patent [19]

Dreyer et al.

[11] Patent Number: 4,694,759
[45] Date of Patent: Sep. 22, 1987

[54] SEED DRILL

[75] Inventors: Heinz Dreyer; Bernd Scheufler, both of Hasbergen; Benno Wiemeyer, Lotte-Halen; Johannes Lührmann, Wallenhorst, all of Fed. Rep. of Germany

[73] Assignee: Amazonen Werke H. Dreyer GmbH & Co. KG, Hasbergen-Gaste, Fed. Rep. of Germany

[21] Appl. No.: 766,000

[22] Filed: Aug. 15, 1985

[30] Foreign Application Priority Data

Aug. 25, 1984 [DE] Fed. Rep. of Germany ....... 3431327

[51] Int. Cl.$^4$ .......................... A01C 7/20; A01B 49/06
[52] U.S. Cl. ..................................... 111/85; 172/709; 172/624.5; 172/711
[58] Field of Search ..................... 172/709, 624.5, 264, 172/265, 266, 267, 268, 711; 111/85–87, 52, 73, 80, 61, 62

[56] References Cited

U.S. PATENT DOCUMENTS

| 469,109 | 2/1892 | Williams | 172/266 |
| 1,290,446 | 1/1919 | White | 172/708 |
| 2,713,836 | 7/1955 | Ajero | 111/85 X |
| 3,737,156 | 6/1973 | Ward | 172/711 |
| 4,208,974 | 6/1980 | Dryer | 111/85 |
| 4,452,317 | 6/1984 | Moos | 172/266 |
| 4,452,319 | 6/1984 | Miguet | 172/709 |
| 4,580,507 | 4/1986 | Dreyer | 111/85 |

FOREIGN PATENT DOCUMENTS

| 3216376 | 11/1983 | Fed. Rep. of Germany . | |
| 64566 | 6/1955 | France | 172/624.5 |
| 674705 | 7/1979 | U.S.S.R. | 172/624.5 |

Primary Examiner—Richard J. Johnson
Attorney, Agent, or Firm—Sprung Horn Kramer & Woods

[57] ABSTRACT

A seed drill for applying seed and/or fertilizer has a frame, reservoir, and sowing shares. The sowing shares are attached to the frame in such a way that they can move in an upright plane by means of superimposed and at least approximately parallel struts on parallelogram mounts. To essentially improve the share mounts, allowing them to be employed on direct-sowing seed drills and especially on soils thickly set with entrenched stones or other obstacles and preventing damage to the shares or share mounts when the shares are laterally overstressed, at least one strut on a parallelogram mount is elastic.

17 Claims, 11 Drawing Figures

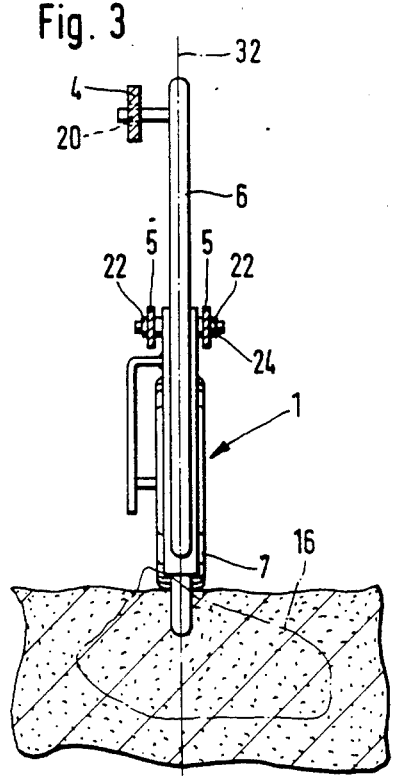
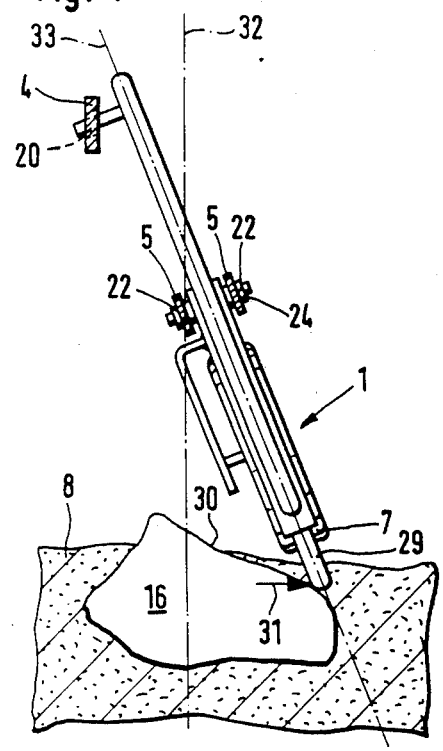
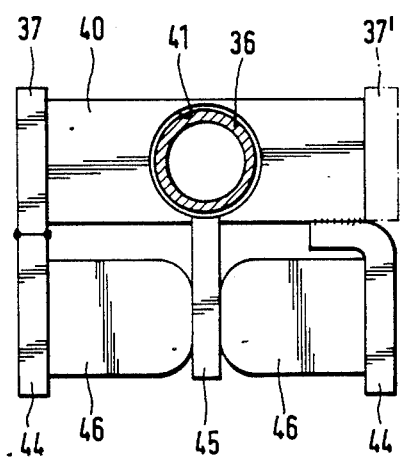

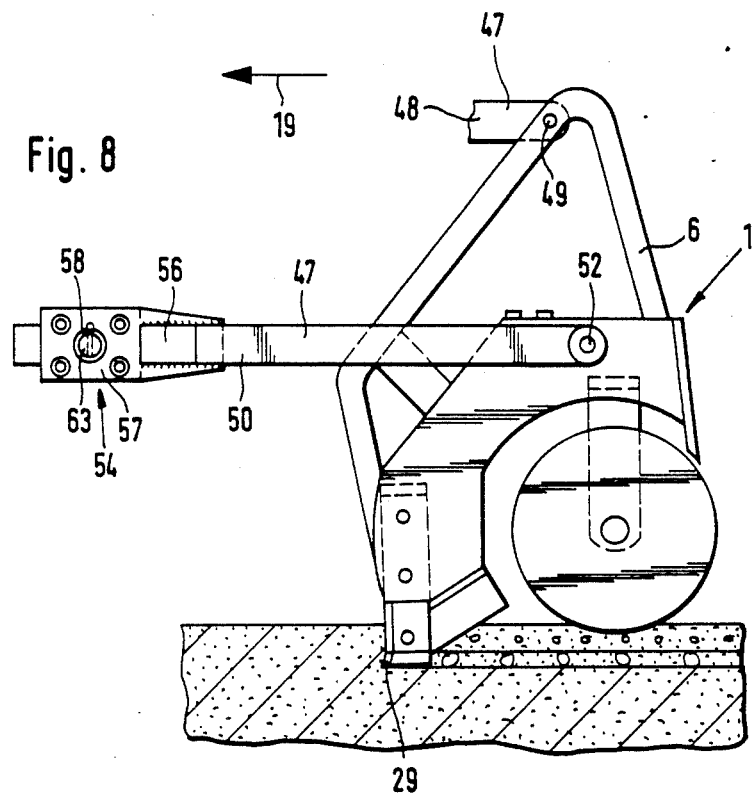
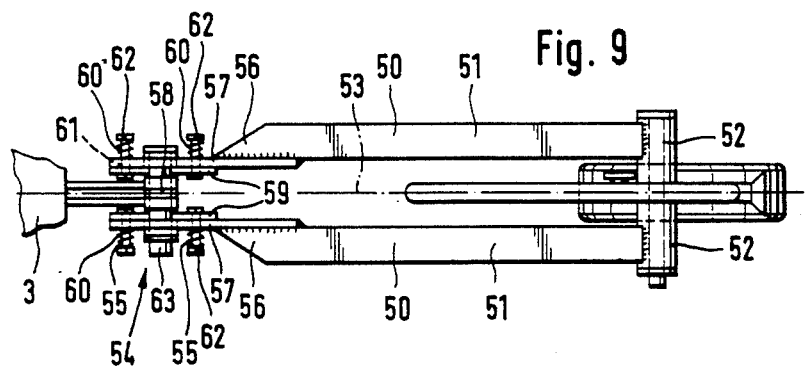

SEED DRILL

BACKGROUND OF THE INVENTION

The present invention relates to a seed drill for applying seed and/or fertilizer, wherein the sowing shares are attached to a frame in such a way that they can move in an upright plane by means of superimposed and at least approximately parallel struts on parallelogram mounts.

A seed drill of this type is known from German OS No. 3 216 376 corresponding in part to U.S. Pat. No. 4,580,507. The sowing shares therein are positioned on the frame by means of parallelogram mounts. The practical result is that the shares always assume the same orientation with respect to the surface of the soil. Since the drill is mostly employed on uncultivated soils, the shares must penetrate into a hard soil that has stones and other obstacles distributed through it to some extent, cutting a furrow in the soil that seed and fertilizers if necessary are then deposited in. One problem in this type of approach, which is called direct sowing and includes the zero, minimum, and reduced tillage methods, is that the stones and other obstacles are entrenched very stubbornly in the uncultivated soil and cannot be shifted to the side by the sowing shares when encountered by them.

To enable the shares to avoid such stones or other obstacles, a system called stone counteraction is built into the parallelogram mounts on this drill. The upper struts in the mounts are designed to yield against a resilient force, allowing each share to swing back and slide over the stone or other obstacle.

Although this type of stone counteraction has been proven in practice, it has turned out to be not always completely satisfactory. Stone security, the capacity, that is, of the upper struts on the parallelogram mount to yield and allow the shares to pivot out of the way, works adequately only when the share encounters an obstacle more or less frontally. When, however, the share encounters a surface of the obstacle that is oriented at an angle to the direction of travel, the share is forced to one side and will not swing back because the resulting force component is too weak to make the strut yield. Forcing the share to the side will bend the share mount or the share itself.

SUMMARY OF THE INVENTION

The object of the present invention is to essentially improve the share mounts, allowing them to be employed on direct-sowing seed drills and especially on soils thickly set with entrenched stones or other obstacles and preventing damage to the shares or share mounts when the shares are laterally overstressed.

This object is attained in that at least one strut on a parallelogram mount is elastic. This measure makes it possible for the share to yield laterally when it encounters a stone from the side or a surface of a stone that is oriented at an angle to the direction of travel, without the share, the strut, or the strut mount getting damaged or bent. Once the share has cleared the stone, it will spring back into its original position.

In one preferred embodiment of the invention at least the lower struts on the parallelogram mounts are inherently elastic and the struts are leaf springs. This measure results in a very simple and strong mount. The share can yield laterally to a considerable extent while still being reliably secured in its intended position.

To make it possible to place the shares very close together, the struts can be positioned on edge, with the height H of the struts being greater than their width B. This makes it possible for the struts to be very narrow and take up very little space across the direction of travel.

In one preferred embodiment of the invention, each lower strut is provided with at least two mutually adjacent leaf springs. This ensures enough torsional resistance to prevent the share from yielding laterally until subjected to a certain level of force.

Preferably, the leaf springs are positioned at intervals and each sowing share is positioned between adjacent leaf springs.

To introduce tie forces into the joints as symmetrically as possible and to keep as many bending forces as possible as far away from the joints as possible, there is at least one leaf spring on each side next to the share.

The sowing share is preferably positioned at the midpoint between the leaf springs along the direction of travel. Each sowing share is positioned on a lower strut with joints and the axis of each joint extends across the direction of travel. The joints of the struts are provided with bushings that are wider by a multiple than the narrow side of the struts and the bushings are positioned in intermediaries to which the leaf springs are screwed.

In another embodiment of the invention, at least the lower struts 35 of the parallelogram mounts are in themselves elastic and there is one joint in each lower strut, whereby the axis of the joint extends at least approximately along the strut and along the direction of travel. This measure makes it possible to refit currently available seed drill with the new elastic struts at low expense if their existing struts can be replaced. In this type of mount as well the share can yield to the side and will be securely retained in its intended position.

The lower strut is divided into two sections connected by the joint and a resilient element is positioned between the two sections in such a way that they can rotate in relation to each other against the resilient force of the element. The section of the divided strut that is positioned on the sowing share is provided with two mutually adjacent arms, and the strut is positioned between the arms on one side of the share, whereas the joint and the other section is positioned on the other side. A bracket is mounted on the forward section of the divided strut and at least one other bracket is mounted on the rear section with at least one resilient element between the two brackets.

In another embodiment of the invention at least the lower strut is positioned in such a way that it can pivot around an axis that extends along the strut against a resilient force and the strut is provided at least at its point of attachment with a resilient connection. These measures also make it possible for the share to yield laterally while being securely retained in its intended position. An advantage of this embodiment is that the struts are in themselves intrinsically rigid and it is only a resilent connection that is positioned between a joint and the strut. This immensely simplifies the design of the strut.

In a preferred embodiment, a bracket is welded onto the forward section of the strut, another bracket is positioned on the joint through which the strut is articulated to the frame, and the bracket mounted on the strut is forced against the bracket on the frame by means of resilient elements. A strut is positioned on each side of the sowing share. The brackets are provided with bores, bolts extend through the bores, and resilient elements are positioned on the bolts.

In another embodiment of the invention at least the lower strut is positioned on the sowing share in such a way that it can rotate against a resilient force around an axis that extends along the strut, and the articulating bolt that connects the strut and the share is positioned in such a way that it can move against a resilient force in relation to the share or the strut. This makes it possible to make the strut itself rigid and to derive the lateral-yield potential of the share from the movability of the articulating bolt. The share can accordingly yield laterally in relation to the strut when the share encounters an entrenched obstacle and is forced to the side by a force engaging it from the side. Once the share has cleared the obstacle it will return to its original position.

In a preferred embodiment, the bolt is mounted in the sowing share 65 in such a way that it can move. The bolt is provided with an annular offset, the offset is positioned in bearing bushing, and resilient elements are positioned on the offset and force the bolt into its base position in the bearing.

The sowing shares can be chisels, with the forward edge of the rip-up portion of the share being erect, or colters with laterally remote alar surfaces. A depth-guidance and/or pressure roller is preferably mounted behind each sowing share. The upper struts can be leaf springs.

To prevent the struts from bending when the share yields and to prevent damage to the joints, both struts are preferably elastic.

In one embodiment of the invention each upper strut is positioned on the share and on the frame through joints in the form of ball-and-socket joints. This embodiment is employed when only the lower strut on a mount is elastic. The upper struts will accordingly not be torsionally stressed along the longitudinal axis of the strut and will therefore not be damaged, whereas the shares will be able to yield laterally unimpeded.

Each sowing share is preferably mounted on the lower struts with joints and the axis of each joint extends across the direction of travel.

To allow the shares to yield backward as well when they encounter an obstacle entrenched in the soil the upper struts in one practical embodiment can buckle against a resilient force.

Some preferred embodiments of the invention will now be described with reference to the attached drawings, wherein

BRIEF DESCRIPTION OF THE DRAWINGS

FIG. 3 is a view of the sowing share along the direction III—III in FIG. 1,

FIG. 4 is the same view of the sowing share as it encounters a stone from the side, FIG. 7 is a view of the resilient element in the lower strut along the direction VII—VII in FIG. 5, FIG. 8 is a side view of another embodiment of a sowing share in accordance with the invention, FIG. 9 is a top view of the share illustrated in FIG. 8.

DETAILED DESCRIPTION OF THE PREFERRED EMBODIMENTS

Figure 1:
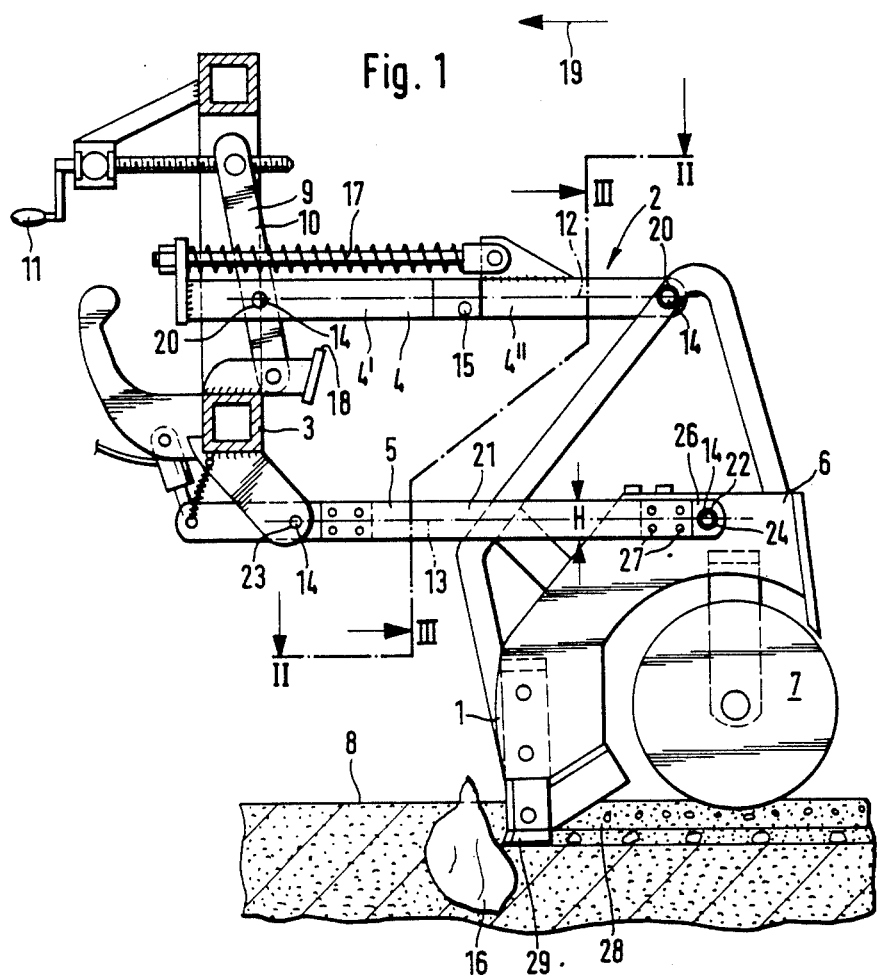
FIG. 1 is a side view of a sowing share in accordance with the invention.

The shares, in the form of chisels 1, are positioned on a frame 3 by means of parallelogram mounts 2 in such a way that the shares can move in an upright plane. Each parallelogram mount 2 has an upper strut 4 and a lower strut 5. The struts are articulated to frame 3 at their forward end, their rear end supporting the holder 6 for a chisel 1. A depth-guidance or compression roller 7 is positioned behind chisels 1. Roller 7 determines the extent that chisel 1 penetrates into soil 8. Parallelogram mount 2 is also attached to a contral device 9 that is employed to set the depth of penetration of chisels 1. This can be accomplished because upper strut 4 is positioned on a lever 10 that can be pivoted with a spindle 11. Pivoting lever 10 pivots upper strut 4 and hence share holder 6, varying the position of roller 7 in relation to chisel 1, so that the depth of penetration of the chisel can be adjusted.

The straight lines 12 and 13 between the axes 14 of rotation of upper and lower struts 4 and 5 are parallel. Upper strut 4 is divided into two sections 4' and 4" connected by a joint 15 positioned outside of connecting line 12, making it possible to swing chisel 1 back and up out of the way when it encounters an obstacle 16. Between strut sections 4' and 4" an elastic element in the form of a compression spring 17 is positioned in such a way that it can be adjusted. Compression spring 17, which is positioned above strut sections 4' and 4", retains upper strut 4 in its normal position. When chisel 1 encounters obstacle 16, the chisel initially swings back, with strut sections 4' and 4" being forced down against the force of compression spring 17. Once forward section 4' has pivoted to a certain extent, it will come to rest against a stop 18 that limits its motion. Once section 4' has come to rest against stop 18, chisel 1 will be lifted up over obstacle 16 due to the lever relationship that now exists as the result of the motion of the drill in direction 19 of travel. Once the chisel has cleared the obstacle, it will be immediately forced into the soil.

Joints 20, which articulate upper strut 4 to the holder 6 that accommodates chisel 1 and to frame 3, are ball-and-socket joints. Ball-and-socket joints 20 allow strut 4 to rotate around connecting line 12 in relation to frame 3 and share holder 6.

Lower strut 5 is in itself elastic and comprise leaf springs 21, which are positioned next to each other at an interval A. Leaf springs 21 make lower strut 5 inherently elastic. The leaf springs 21 of lower strut 5 are all positioned on edge, in such a way that the height H of each spring 21 or of each strut 5 is greater than its width. Each chisel 1 is positioned between two adjacent leaf springs 21 on lower strut 5 in such a way that there is a spring next to each chisel on each side and each chisel is positioned at the midpoint between two leaf springs 21 along the direction 19 of travel. Each leaf spring 21 is attached to a share holder 6 by a joint 22 and to frame 3 by a joint 23. Joints 22 and 23, which have axes 14 of articulation or rotation that extend across the direction 19 of travel, are provided with bushings 24 that are connected to leaf springs 21 and are wider than the narrow side 25 of leaf springs 21 by a multiple. Bushings 24 are welded into intermediaries 26, onto which each leaf spring 21 is fastened by means of screws 27.

In normal operation chisel 1 assumes the position illustrated in FIGS. 1 and 3 and cuts a straight furrow 28 in soil 8. Seed and fertilizer are deposited in the furrow. When chisel 1 encounters an obstacle 16 in the soil from the front, it pivots up as described in the foregoing as upper strut 4 buckles backward and is accordingly lifted over the obstacle.

When, however, chisel 1 encounters a side 30 of an obstacle 16, as indicated by the dot-and-dash line in FIG. 3 that extends at an angle to direction 19 of travel, chisel 1 will be shifted to one side as the result of a force component 31 oriented across direction 19 of travel. Chisel 1 will yield laterally due to the resiliency of lower strut 5, which consists of leaf springs 21. In other words, the leaf springs 21 in lower strut 5 will rotate or twist in such a way that chisel 1 will be forced out of the position illustrated in FIG. 3 into that illustrated in FIG. 4. Lower strut 5, which consists of leaf springs 21, will turn in on itself and is simultaneously forced to the side. The combined elastic twisting and lateral motion brings chisel 1 into the position illustrated in FIG. 4. The midline 32 of chisel 1 in the normal position illustrated in FIG. 3 will become the midline 33 of the chisel in the yielding position illustrated in FIG. 4. Chisel 1 can accordingly slide past obstacle 16 without being damaged.

If the force component acting opposite direction 19 of travel becomes strong enough to force upper strut 4 to buckle, chisel 1 will also swing back and up and will accordingly be lifted over obstacle 16. Once it has cleared obstacle 16, chisel 1 will return to the normal position illustrated in FIGS. 1 through 3. The capacity of upper strut 4 to buckle and of chisel 1 to yield due to the resilience of lower strut 5 enables chisel 1 to avoid any obstacle in soil 8 without being damaged. The lateral yielding motion or twisting of lower strut 5 and hence the yielding of chisel 1 are not impeded by upper strut 4 because the joints 20 that attach upper strut 4 to chisel 1 and frame 3 are ball-and-socket joints.

Figure 5:
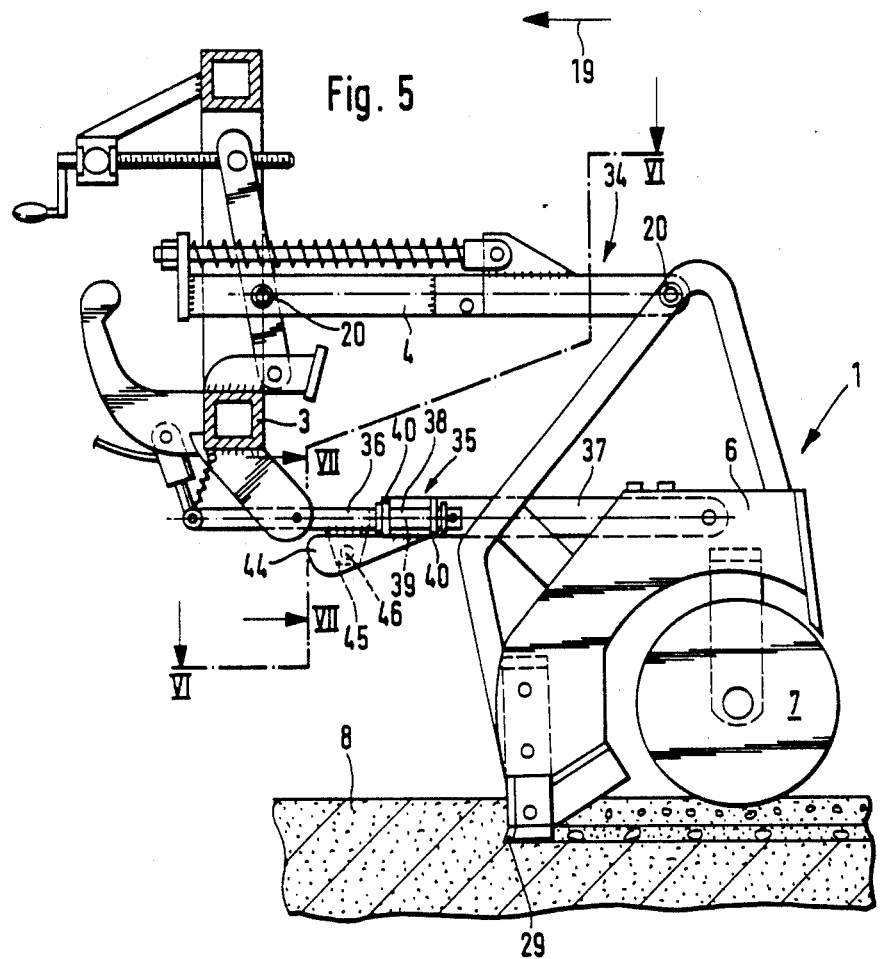
FIG. 5 is a side view of another embodiment of a sowing share in accordance with the invention.
Figure 6:
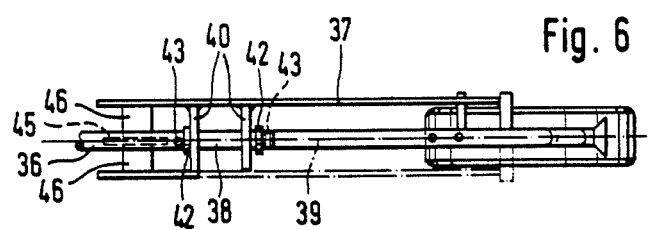
FIG. 6 is a view of the sowing share along the direction VI—VI in FIG. 5.

The chisel 1 illustrated in FIGS. 5–7 is also attached to the frame 3 of a seed drill by means of a parallelogram mount in such a way that the chisel can move in an upright plane. Parallelogram mount 34 has an upper strut 4, which is attached by ball-and-socket joints 20 to a share holder 6 and to frame 3, and a lower strut 35. The position and design of the upper strut 4 of parallelogram mount 34 are identical to those illustrated in FIG. 1. Lower strut 35 is in itself resilient. It is divided into strut sections 36 and 37 connected by a joint 38. The axis 39 of the joint 38 in lower strut 35 extends along the strut and along direction 19 of travel. Joint 38 consists of brackets 40 welded to rear strut section 37 and of bores 41, which forward strut section 36 extends through. Strut sections 36 and 37 are secured in the brackets 40 along lower strut 35 by means of disks 42 and cotter pins 43. Two stop components 44 in the form of brackets are welded to each side of joint axis 39 on rear strut section 37 or brackets 40. A stop bracket 45 is welded between stop components 44 on forward strut section 36. Between each stop component 44 and stop bracket 45 is a resilient element in the form of a rubber cushion 46. This allows strut sections 36 and 37 to twist together against the force of the cushion. Rear strut section 37 is an arm. It is also possible to position another arm 37', indicated with dot-and-dash lines in FIG. 6, on the other side of chisel 1, in such a way that strut section 37 will consist of two separate arms. Thus, chisel 1 will be positioned on one side and joint 38 and strut section 36 on the other side between the arms of strut section 37.

Figure 2:
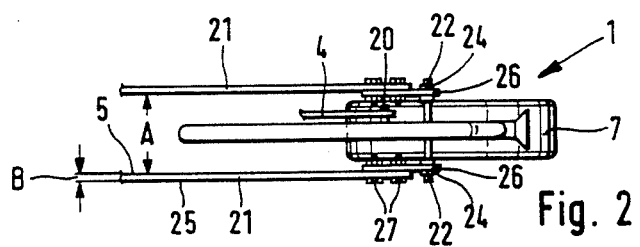
FIG. 2 is a view of the sowing share along the direction II—II in FIG. 1.

Parallelograms mount 34 operates in principle like the parallelogram mount 2 illustrated in FIGS. 1 through 3. When chisel 1 encounters an obstacle entrenched in the soil from the front, uppers strut 4 will buckle and chisel 1 will swing back and up, lifting over the obstacle. If chisel 1 encounters a side of the obstacle that is oriented at an angle to direction 19 of travel, the point 29 of chisel 1 will yield to one side and the chisel will pivot to the side around joint axis 39 against the force of rubber cushion 46. The chisel can accordingly "deviate" around the obstacle. Chisel 1 can also swing back and up when upper strut 4 buckles due to the excessive strength of a force component acting on share point 29 against direction 19 of travel.

The chisel illustrated in FIGS. 8-9 is also attached to the frame 3 of a seed drill by means of a parallelogram mount in such a way that the chisel can move in an upright plane. Parallelogram mount 47 has an upper strut 48, which is attached by joints 49 to a share holder 6 and to frame 3, and a lower strut 50. Upper strut 48 consists of two strut sections as in FIG. 1 and of a compression spring 17 that retains the strut in the normal position. Since upper strut 48 consists of leaf springs, it is in itself resilient.

Lower strut 50 consists of two strut arms 51 attached to share holder 6 with a joint 52. Lower strut 50 is positioned on frame 3 in such a way that it can rotate around an axis 53 extending along lower strut 50. Since the point 54 of attachment of lower strut 50 to frame 3 is provided with a resilient connection 55, strut 50 is positioned in such a way that it can rotate against a resilient force. A bracket 57 is welded to each strut arm 51 on the front 56 of lower strut 50. The joint 58 that connects lower strut 50 to frame 3 also has other brackets 59. The brackets 57 welded to strut arms 51 are forced by a resilient element in the form of a compression spring 60 against the brackets 59 attached to frame 3. Each bracket 57 and 59 has four bores 61 that bolts 62 extend through. Compression springs 60 are positioned on bolts 62. Since brackets 59 are positioned on the articulating bolts 63 of joint 58 with a slight lateral play, the arms 51 of lower strut 50 can twist around axis 53 or can yield laterally.

When the point 29 of chisel 1 encounters an obstacle in the soil frontally, the strut will buckle as in the embodiment illustrated in FIG. 1 and the chisel will swing back and up, lifting over the obstacle without damage.

When chisel point 29 encounters a side of an obstacle that extends at an angle to direction 19 of travel, the chisel will be shifted to one side against the force of resilient connection 55. Chisel 1 will rotate around an axis extending along direction 19 of travel and will simultaneously be forced slightly to one side, sliding past the obstacle. If the force component acting against direction 19 of travel becomes strong enough, upper strut 48 will buckle.

Figure 10:
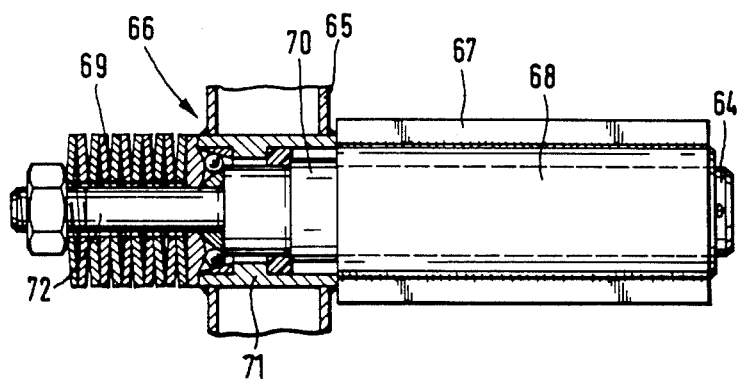
FIG. 10 is a partly sectional rear view of the position of the articulating bolt of the lower strut.
Figure 11:
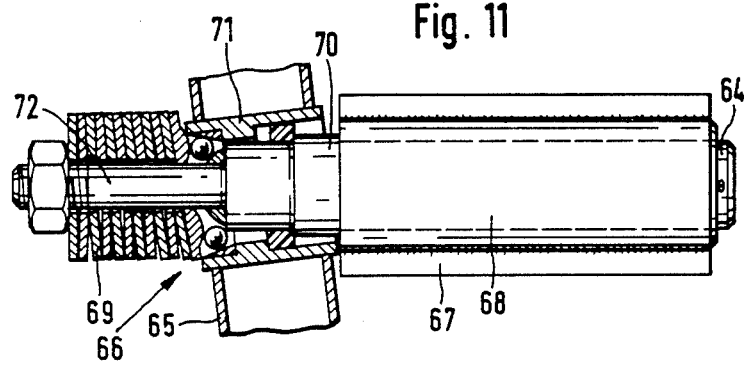
FIG. 11 is the same view as in FIG. 10 with the sowing share yielding laterally and at an angle.

Of the embodiment illustrated in FIGS. 10 and 11 only the position of articulating bolt 64 in sowing share 65 in relation to the joint 66 in the lower strut 67 of the parallelogram mount by means of which the share is positioned on the frame of a seed drill in such a way that the share can move in an upright plane is shown. Articulating bolt 64 is mounted at one end in such a way that it can rotate in a bushing 68 in lower strut 67. Articulating bolt 64 is mounted to move in sowing share 65 against the force of cup springs 69 positioned on the bolt. Lower strut 67 is accordingly mounted in such a way that it can rotate around an axis extending along the strut against the force of cup springs 69. Thus, the articulating bolt 64 connecting lower strut 67 and sowing share 65 can move in relation to sowing share 65 against the force of cup springs 69. Bolt 64 has an annular offset 70 at the end remote from lower strut 67. The offset 70 in articulating bolt 64 is positioned in bearing bushing 71 of the mount that secures the bolt in sowing share 65. Cup springs 69 are positioned at the end 72 of articulating bolt 64 that extends out of sowing share 65 and force the bolt into the basic position illustrated in FIG. 10. When the point of sowing share 65 encounters a side of an obstacle in the soil that is oriented at an angle to the direction of travel, the share is forced to one side and articulating bolt 64 will assume the position illustrated in FIG. 11 inside the share. Once the share has cleared the obstacle, cup springs 69 will force articulating bolt 64 back into its basic position.

It will be appreciated that the instant specification and claims are set forth by way of illustration and not limitation, and that various modifications and changes may be made without departing from the spirit and scope of the present invention. In particular, the design is not restricted to chisels with an erect forward rip-up portion edge but can also be employed for colters with laterally remote alar surfaces.

What is claimed is:

1. In a seed drill movable in a direction of travel for applying at least one of seed and fertilizer, having a frame, reservoir, sowing shares, and means attaching each sowing share to the frame to enable the sowing share to move in an upright plane parallel to the direction of travel including a parallelogram mount with superimposed and at least approximately parallel upper and lower struts, the improvement wherein the attaching means further comprises: the upper strut having a longitudinal axis parallel to the direction of travel when in the horizontal working position, the lower strut having a narrow side and being inherently elastic and comprising spaced apart leaf springs, wherein the lower strut has connection means mounting a sowing share, the connection means including an axis extending transverse to the direction of travel and including an intermediary fastened to the leaf spring and to a bushing mounted on the intermediary and which is wider by a multiple of the narrow side of the lower strut and means including said elastic lower strut enabling the sowing share to deflect laterally about the longitudinal axis of the upper strut.

2. The seed drill according to claim 1, wherein the lower strut is positioned on edge such that the height is greater than the width.

3. The seed drill as in claim 1, wherein each lower strut comprising at least two mutually adjacent leaf springs positioned at intervals, wherein each sowing share is positioned between adjacent leaf springs, and wherein the sowing share is positioned at least approximately at the midpoint between the leaf springs along the direction of travel.

4. The seed drill according to claim 1, further comprising at least one of a depth-guidance and pressure roller mounted behind each sowing share relative to the direction of travel.

5. The seed drill according to claim 1, wherein the enabling means comprises the upper strut comprising a leaf spring and means connecting the upper strut to the frame.

6. The seed drill as in claim 1, wherein the enabling means comprises each upper strut being nonelastic and mounted to a share and to the frame through joints comprising ball-and-socket joints.

7. The seed drill according to claim 1, wherein the upper and lower struts are elastic.

8. The seed drill as in claim 1, wherein the upper struts include two articulated sections and are mounted to effect buckling against a resilient force.

9. The seed drill as in claim 1, wherein the means enabling elastic yielding comprises at least the lower struts of the parallelogram mounts being elastic and each includes one joint and wherein the axis of the joint extends at least approximately along the strut and along a direction of travel wherein each lower strut is divided into two sections connected by the joint and at least one resilient element is positioned between the two sections such that the two sections can rotate in relation to each other against the resilient force of the element.

10. The seed drill as in claim 9, wherein one section of the divided strut is positioned on the sowing share and has two mutually adjacent arms, and the one section is positioned between the arms on one side of the share, with the joint and the other section positioned on the other side and wherein a bracket is mounted on the forward section of the divided strut and at least one other bracket mounted on the rear section with the at least one resilient element positioned between the two brackets.

11. The seed drill as in claim 1, wherein the means enabling elastic yielding comprises means mounting at least the lower strut for pivotal movement around an axis that extends along the strut against a resilient force including a resilient connection at least at its point of attachment.

12. The seed drill as in claim 11, wherein the mounting means comprises one bracket welded onto a forward section of the lower strut, another bracket positioned on the joint through which the strut is articulated to the frame and wherein the resilient connection includes resilient elements forcing the brackets against each other, wherein a lower strut is positioned on each side of the sowing share and wherein the brackets are provided with four bores and bolts extending through the bores with the resilient elements positioned on the bolts.

13. The seed drill as in claim 1, wherein the means enabling elastic yielding comprises means mounting at least the lower strut on the sowing share to permit rotation of the share against a resilient force around an axis that extends along the lower strut, including an articulated bolt that connects the strut and the share positioned to move against a resilient force in relation to the share or the strut and wherein the bolt is movably mounted in the sowing share.

14. The seed drill as in claim 13, wherein the bolt has an annular offset positioned in a bearing bushing and resilient elements are positioned on the offset and force the bolt into a base positioned in the bearing bushing.

15. The seed drill as in claim 1, wherein the means enabling elastic yielding comprises the upper struts comprising leaf springs.

16. The seed drill as in claim 1, wherein the means enabling elastic yielding comprises the upper and lower strut being elastic.

17. The seed drill as in claim 1, wherein each sowing share is mounted on a lower strut, with joints and the axis of each joint extends across the direction of travel.

* * * * *